Patented Sept. 13, 1927.

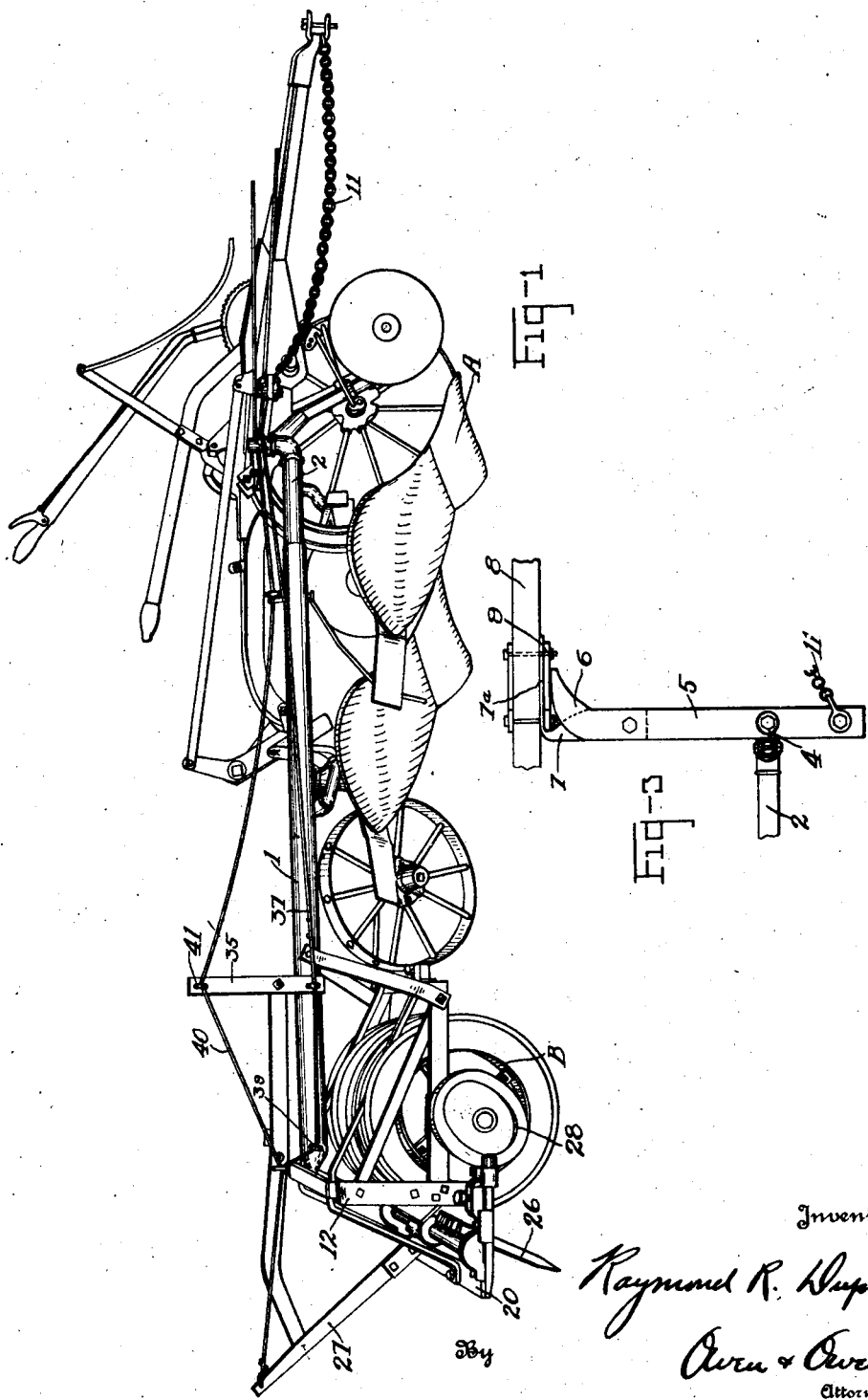

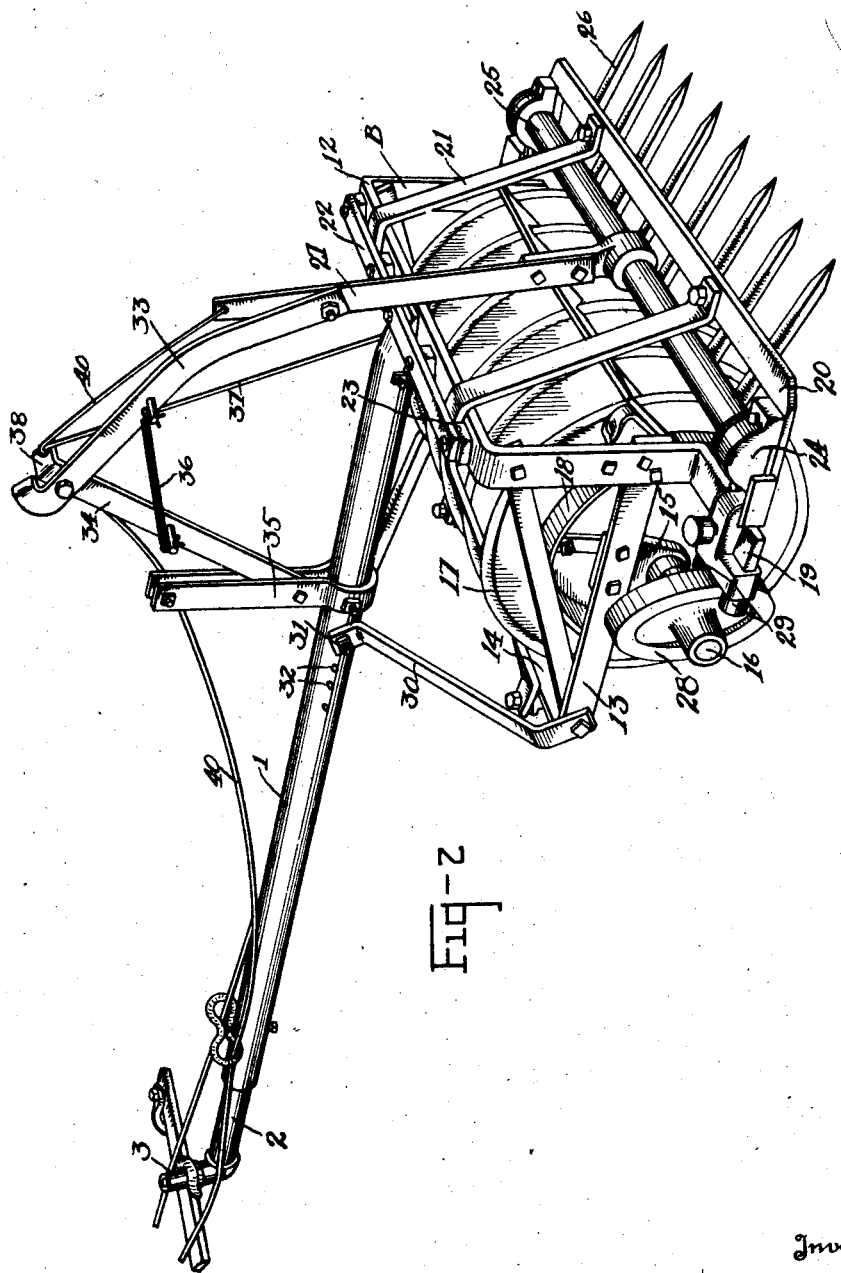

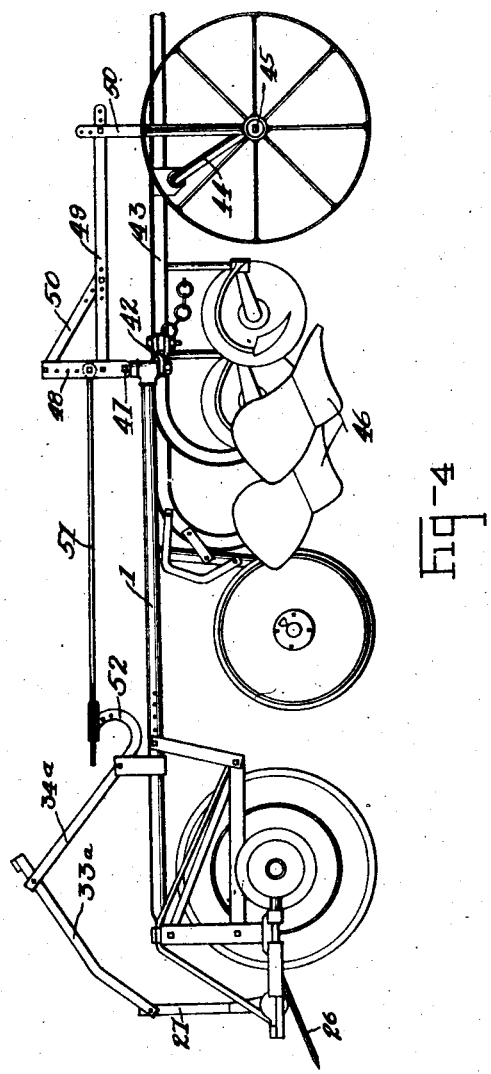

1,642,144

UNITED STATES PATENT OFFICE.

RAYMOND R. DUPLER, OF TOLEDO, OHIO.

PLOWING DEVICE.

Application filed March 25, 1926. Serial No. 97,275.

This invention relates to farming implements but more particularly to plows and harrows for tilling or cultivating the soil of the type in which the rolling colter precedes the plow and in which the harrow and colter function to level, disintegrate and distribute the turf turned over by the plow.

Objects of this invention are to provide a new and efficient harrow in connection with a rolling apparatus which operates in a proper manner to break up, level and spread the soil; to enable a harrow having a considerably greater number of teeth than has heretofore been possible to be used efficiently without, liability of clogging; to provide a new and improved apparatus for cultivating the soil which is operable simply and efficiently to disintegrate the turfs and place the ground in proper condition for planting; to provide improved mechanism for placing the harrow in operative and inoperative position with a minimum amount of effort and trouble; and in general to provide a plowing apparatus having the features of construction, arrangement and operation hereinafter more fully described.

The invention is shown by way of illustration in the accompanying drawings in which:

Fig. 1 is a side elevation of an apparatus for plowing, harrowing or cultivating the soil and embodying the present invention; Fig. 2 is a perspective view of the colter and harrow shown in Fig. 1; Fig. 3 is a top plan view of the means for attaching the colter and harrow arrangement to the plow; and Fig. 4 is a side elevation of another form of the invention showing means for conjointly positioning the plow and harrow for work.

In the embodiment of the invention shown Figs. 1 to 3, there is shown a plow of the usual type generally indicated by the letter A and having two plowshares. As the plow alone has no particular bearing on the invention further detail description is not considered necessary. Attached to the plow A a harrow and colter arrangement B which is drawn by the plow and serves to break up, spread and level the turf turned up by the plow.

The forward end of the colter and harrow arrangement is provided with a draft rod 1 which receives a rod 2 to enable length adjustment to be effected, the rod 2 being secured in adjusted position in any suitable manner. The forward end of the rod 2 is formed with an upwardly extending projection 3 which is suitably held in engagement with an arm 5 by means of a connecting device 4. One end of the arm 5 is formed with a forwardly inclined part 6 and suitably fixed to the under side of the arm 5 is an attaching member 7 formed with a forwardly curved part 7$^a$ and this part is secured to a member 8 of the plow A. As shown the part 7$^a$ is clamped to the member 8 by a pair of plates 9, one of which is placed on either side of the member and bolts 10, one placed above and one below the member 8 hold the curved part 7$^a$ in place.

It will be seen that by means of the above attachment the colter and harrow arrangement B may be positioned in proper relation to the plow A and one side thereof, and part of the pulling force from the member 8 to the rod 2 is taken up by the arm 5 through the forwardly inclined part 6 which may bear against the adjacent plate 9, and parts 7 and 7$^a$ which cooperate with the inclined part 6. The opposite end of the arm 5 is connected to the plow A by means of a chain 11, so that the pull is properly distributed.

Connected to the rear end of the draft rod 1 is a U-shaped frame 12 having forwardly projecting bars 13 to which are secured a cross bar 14. Depending from an intermediate part of the bars 13 are bearing members 15 in which is journaled a shaft 16 and fixed to the shaft 16 for rotation therewith are rolling colters. Each colter consists of a circular disk 17 on either side of which and in close relation is arranged a roller 18 secured thereto in any suitable or preferred manner.

It is to be noted that the rollers 18 are of substantially less diameter than the diameter of the disk 17 and that the peripheral surface is relatively wide and flat. By providing a construction of the abovedescribed character, it will be seen that the disk 17 cuts into, breaks up or divides the turf turned over by the plow and the rollers concomitantly roll the soil or spread that which has been freshly cut by the disk thereby assisting in the disintegration and leveling of the earth.

The lower end portions of the U-shaped frame 12 are formed with outwardly extending projections 19, and slidable on these projections is the U-shaped harrow frame 20. It is to be noted that the harrow frame is disposed rearwardly of and below the pivotal mounting of the frame 12 so that the weight of the harrow frame and associated parts tends to lower the harrow teeth to operative position. Substantially inverted V-shaped braces 21 connect the outer portion of the harrow frame to the forward cross bar 14 and the intermediate portion of these braces engages the top surface of the U-shaped member 12, a bar 22 spaced from the upper surface of the member 12 by blocks 23 serving to guide and retain the braces 21 in proper position.

Journalled at its opposite ends in bearing blocks 24 carried by the harrow frame 20 is a shaft 25 to which the harrow teeth 26 may be secured in any suitable or preferred manner. Preferably the harrow teeth are inclined rearwardly and downwardly and relatively closely placed together. Secured to and projecting outwardly from the shaft 25 is an arm 27 for rotating the shaft 25 to move the harrow teeth 26 to operative or inoperative position.

An outstanding feature of this invention resides in the provision of means for moving the harrow teeth in a horizontal plane at right angles to the planes of the colters. It will readily be seen that by imparting such movement to the harrow teeth when the latter are placed in operative position, the soil or turf partially cut and disintegrated by the colter will be efficiently broken up and distributed by the harrow teeth so that the ground is effectively leveled for planting. Heretofore the number of teeth in the harrow and the relative position thereof has been restricted owing to the fact that clogging of sod or turf between the teeth has resulted, but by reciprocating the harrow as above indicated, this objection is eliminated and the teeth may consequently be placed closer together so that as a result, more efficient breaking and disintegration of the ground occurs.

As shown, the harrow frame 20 is slidable at its forward end portions on the projections 19 of the U-member 12, and for driving or reciprocating the frame 20 by the rolling action of the colters, cam wheels 28 are fixed to the projecting ends of the shaft 16, and the sides of these wheels are engaged between the horizontal positioned rollers carried by the harrow. The wheels are so shaped that, as the shaft 16 rotates, horizontal reciprocatory movement is imparted to the harrow frame thereby effecting a crosswise movement of the harrow teeth 26 with respect to the colters.

In order to adjust the position of the harrow teeth 26 with respect to the colters so as to position the teeth at the required depth into the ground, arms 30 are pivotally secured at one end to the forward end portion of the bars 13, and the opposite ends of these arms are adjustably connected to the draw bar 1 by bolts and nuts 31, a plurality of openings 32 being formed in the draw bar 1 so that the position of the arms 30 may be adjusted, thereby to raise or lower the teeth 26 with respect to the colters. It will be understood that by connecting the arm 30 to one of the forward openings 32 the teeth 26 will be lowered with respect to the colter and by connecting the arms to one of the rearward openings 32, the teeth will be correspondingly raised.

For holding the teeth 26 in operative position the arm 27 must be held in outward position as shown in Fig. 1, and for this purpose a pair of toggle levers 33 and 34 are pivoted together at one end, the lever 33 is pivoted to the arm 27 at a spaced distance at the outer end thereof, and the lever 34 is pivoted at its outer end to a bracket 35 clamped to the draw bar 1. It will be seen that when the levers 33 and 34 are extended so as to lie in substantially the same plane, the arm 27 is moved outwardly, thereby to operatively position the harrow teeth 26. When the toggle is released a slight extent a coil spring 36 connected to intermediate portions of the levers 33 and 34 raise the arm 27 to the position indicated in Fig. 2 and in this manner move the teeth to a position out of use.

A cable 37 is connected at one end to a bent end portion 38 of the lever 34 and passes through a staple 39 on the draw bar 1, extending therefrom to the forward part of the apparatus for convenient operation by the driver. It will be seen that when a pull is exerted on the cable 37 the pivotal connection of the levers 33 and 34 is moved downwardly, thereby to extend the levers and position the teeth 26 properly for work. In order to release the toggle the cable 40 is connected at one end to the outer end of the arm 27, passes through an opening in the bent end portion 38 of the lever 34 and through a staple 41 in the bracket 35 to the forward portion of the apparatus and when a pull is imparted to this cable the arm 27 is raised a slight distance whereafter a coil spring 36 operates to move the parts to the position shown in Fig. 2.

In the form of the invention illustrated in Fig. 4 the draw bar 1 is connected at its forward end to a bracket 42, which in turn is connected to a beam 43 of the plow. The beam 43 is suitably connected by an arm 44 to the front axle 45. In a plow of the form shown, suitable mechanism is provided for raising and lowering the shares 46, which swing on the front axle 45 as an axis. It will thus be seen that when the shares 46 are raised or lowered the draw bar 1 is correspondingly moved.

Pivoted at 47 at the end portion of the draw bar 1 is an upright bracket 48 to which is adjustably connected a bar 49, the forward end of which is adjustably connected to an upright brace 50 carried by the axle 45. The bar 49 is braced to the upright bracket 48 by a bar 50 which is adjustably connected to the bar 49 and brace 48 at its opposite ends. Connected to an intermediate portion of the upright 48 and adjustable thereon is a rod 51 which extends rearwardly and is adjustably connected to a reversely bent end portion 52 of the toggle lever 34ª. The toggle lever 34ª is pivoted at its inner end to the toggle lever 33ª and the remaining parts of the harrow and colter are similar to those hereinbefore described.

In the operation of the apparatus shown in Fig. 4 when the plowshares are lowered to operative position the bracket 48 is moved in a counterclockwise direction on its pivot 47 thereby exerting a pushing force on the reversely bent end portion 52 of the toggle lever 34ª for extending the toggle lever and lowering the harrow teeth 26 to operative position. Upon raising the plowshares 46 the bracket 48 is moved in a clockwise direction to exert a pulling force on the rod 51 for releasing the toggle levers, and, thereby concomitantly raising the teeth 26 to inoperative position. In this manner it will be understood that when the plowshares 46 are lowered the harrow teeth 26 are concomitantly moved to operative position and when the plowshares are raised to a position out of use the harrow teeth 26 are at the same time moved in a corresponding manner.

An outstanding characteristic of the invention resides in reciprocating or actuating the harrow teeth 26 crosswise of the colters so that more efficient disintegration of the soil is effected. Another important feature resides in the unique mechanism for raising and lowering the harrow teeth so that the teeth may be conveniently positioned in accordance with the requirements for work. A further characteristic of the invention resides in the means for moving the harrow teeth to operative or inoperative position in the simple and convenient manner hereinbefore described. The unique connection between the draw bar and the plow is also of importance and admirably adapted for the purpose.

While I have shown and described a machine which is admirably adapted for tilling the soil and for accomplishing the objects hereinbefore stated, it is to be understood that the above description is given by way of illustration and not of limitation, and numerous changes in details of construction, arrangement and operation may be effected without departing from the spirit of the invention, especially as defined in the appended claims.

What I claim as new and desire to secure by Letters Patent is:

1. In a device of the class described, the combination of a frame, a shaft journaled in said frame, rollers fixed to said shaft, a harrow connected to said frame and disposed in the rear thereof, means for permitting crosswise movement of said harrow relative to said frame, a cam roller fixed to said shaft, and a connection between said cam roller and said harrow whereby rotation of said cam roller imparts horizontal reciprocatory movement to said harrow.

2. In a device of the class described, the combination of a frame, rolling colters carried by said frame, a harrow disposed in the rear of said frame and comprising a frame slidably connected to said main frame in rear of the axes of said rollers and rearwardly inclined teeth, said teeth being mounted for vertical swinging movement whereby said teeth may be moved away from the ground, and a cam roller driven by said colters and connected to said harrow frame for reciprocating said harrow in a direction crosswise to said colters.

3. In a device of the class described, the combination of a frame, rollers mounted in said frame, a harrow connected to said frame and disposed in the rear thereof, means driven by said rollers for horizontally reciprocating said harrow, and toggle means for holding said harrow in operative position, said toggle means being releasable to enable said harrow to be moved to inoperative position.

4. In a device of the class described, a draft bar, an arm extending at right angles from said bar, a curved end portion on said arm, a member fixed to the end portion of said arm and having an outwardly bent end portion terminating adjacent said curved end portion, a plate on the outer side of said bent end portion, and means for securing a member to said plate.

In testimony whereof I have hereunto signed my name to this specification.

RAYMOND R. DUPLER.